June 15, 1926.  1,588,761

A. J. LIGOT

METHOD OF MAKING A BRAZING STICK

Filed July 5, 1923

Inventor
Albert Joseph Ligot
By H. B. Wilson & Co.
Attorneys

Patented June 15, 1926.

1,588,761

UNITED STATES PATENT OFFICE.

ALBERT JOSEPH LIGOT, OF VERNOIL LE FOURRIER, FRANCE, ASSIGNOR TO SOCIÉTÉ DES PLAQUES ET POUDRES À SOUDER, OF PARIS, FRANCE.

METHOD OF MAKING A BRAZING STICK.

Application filed July 5, 1923, Serial No. 649,656, and in France July 13, 1922.

It has already been proposed to manufacture sticks for brazing or soldering metals by enclosing a suitable brazing or soldering alloy, mixed with a flux, in a tubular envelope which is usually metallic, for instance of brass.

Known envelopes of this class are formed of a drawn metal tube or of a sheet which is rolled into a cylinder with juxtaposed edges. But as the tube had a small diameter it was difficult to fill it with the material, and the products in powder or in the granulated state could not be disposed in a positive and reliable manner within the tube. Further, with a rolled tube having juxtaposed edges, the latter frequently became separated when the tube was distorted by bending or compression, or in other cases when the material contained in the tube swelled by reason of heat or from other causes, so that the substance fell out of the slot in the tube, and the device thus had various drawbacks when in practical use.

In my invention, I utilize a thin metallic strip which is curved into the form of a trough; the brazing substances are disposed therein, and the device is closed by placing in a machine so as to bring the edges together, these being fastened by clamps or by a rolling action, or by any other suitable means.

The appended drawings show by way of example a form of construction of a stick according to my invention.

Figs. 1 to 6 illustrate the various forms assumed by the metallic band in the process of forming the envelope of the stick.

Figure 1:
Figure 2:
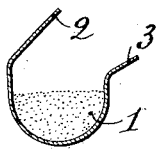
Figure 3:
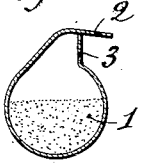
Figure 4:
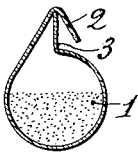
Figure 5:
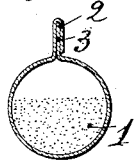
Figure 6:
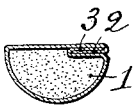

The flat band, Fig. 1, is first pressed in a matrix and is thus given the shape of a trough with folded edges, Fig. 2. The said trough is then filled with the brazing or soldering mixture 1, or solely with a flux. The folded edges 2, 3 are then brought together, Fig. 3, and are suitably fastened, for example by fitting into one another, Fig. 4, or by pressing together, Fig. 5, and the whole is finished by the upsetting process, as shown in Fig. 6.

These various operations can be performed by any suitable machine, for example the machines used in the tin plate industry and providing for a suitable fastening by the known methods. When the device is thus fastened, the mixture 1 will be well maintained within the envelope. It is even feasible to obtain a greater cohesion by subjecting the said rod to a suitable rolling or compression.

Since the edges of the tube can not be readily separated, all danger of opening and consequent spilling of the contents will be obviated. Further, all difficulties in filling the tube will be eliminated.

Obviously, the edges of the band might be joined together by other methods, for instance by sewing, rolling and the like.

Claims:

1. Process of manufacture of sticks or rods containing granular and powdered substances for brazing and soldering metals, consisting in conferring upon a thin metal band the shape of a trough, in filling this trough with the said substances, in completely closing the trough around the said substances and in connecting the edges of this trough by means of clamps by compression.

2. Process of manufacture of sticks or rods containing granular and powdered substances for brazing and soldering metals, consisting in conferring upon a thin metal band the shape of a trough, in filling this trough with the said substances, in completely closing the trough around the said substances and in connecting the edges of this trough by means of clamps and in rolling the stick or rod which has been thus formed.

In testimony that I claim the foregoing as my invention I have signed my name.

ALBERT JOSEPH LIGOT.